US012215006B2

(12) United States Patent
Fretz et al.

(10) Patent No.: US 12,215,006 B2
(45) Date of Patent: Feb. 4, 2025

(54) SYSTEMS FOR WINCH ROPE INTERFACES AND RECOVERY RIGGING MOUNTABLE TO A WINCH FAIRLEAD AND/OR VEHICLE BUMPER

(71) Applicant: Warn Industries, Inc., Clackamas, OR (US)

(72) Inventors: Darren G. Fretz, Oregon City, OR (US); Jackson C. Wang, Happy valley, OR (US)

(73) Assignee: Warn Industries, Inc., Clackamas, OR (US)

(*) Notice: Subject to any disclaimer, the term of this patent is extended or adjusted under 35 U.S.C. 154(b) by 365 days.

(21) Appl. No.: 17/496,211

(22) Filed: Oct. 7, 2021

(65) Prior Publication Data

US 2022/0024735 A1 Jan. 27, 2022

Related U.S. Application Data

(62) Division of application No. 16/176,169, filed on Oct. 31, 2018, now Pat. No. 11,167,963.

(60) Provisional application No. 62/580,289, filed on Nov. 1, 2017.

(51) Int. Cl.

| | |
|---|---|
| ***B66D 1/36*** | (2006.01) |
| ***B66D 1/00*** | (2006.01) |
| ***B66D 1/28*** | (2006.01) |
| *B66D 1/38* | (2006.01) |
| *B66D 1/60* | (2006.01) |

(52) U.S. Cl.
CPC ................. *B66D 1/36* (2013.01); *B66D 1/00* (2013.01); *B66D 1/28* (2013.01); *B66D 1/38* (2013.01); *B66D 1/60* (2013.01)

(58) Field of Classification Search
CPC ... B66D 3/24; B66D 1/36; B66D 1/00; B66D 1/28; B66D 1/60; B66D 1/7463; B66D 1/56; B66D 5/16; F16G 11/00
See application file for complete search history.

(56) References Cited

U.S. PATENT DOCUMENTS

| | | | | |
|---|---|---|---|---|
| 9,388,025 | B2 * | 7/2016 | Costa | F16G 11/02 |
| 10,202,260 | B2 | 2/2019 | Costa | |
| 10,273,126 | B1 * | 4/2019 | Huang | B66D 1/28 |
| 10,519,012 | B1 * | 12/2019 | Hare | B66D 1/36 |
| 2004/0227324 | A1 * | 11/2004 | Popham | B60D 1/38 280/478.1 |

(Continued)

OTHER PUBLICATIONS

*Warn Industries Inc.*, vs. *Agency 6 Inc.*; Memorandum and Order RE: Defendant's Motion to Dismiss for related U.S. Pat. No. 11,167,963; Case 2:22-cv-01358-WBS-JDP, filed Mar. 8, 2023; (16 pages).

(Continued)

*Primary Examiner* — Sang K Kim
*Assistant Examiner* — Nathaniel L Adams
(74) *Attorney, Agent, or Firm* — K&L Gates LLP

(57) ABSTRACT

Methods, apparatus, and systems are provided for rigging interfaces couple to winch cable terminals that protect outer surfaces of fairleads and rigging devices as connections between objects. In one example, a rigging interface may include curved surfaces adapted to nest against a fairlead. In another example, a rigging device may have one or more removable elements allowing for coupling of the device to other objects.

20 Claims, 8 Drawing Sheets

(56) References Cited

U.S. PATENT DOCUMENTS

| | | | | |
|---|---|---|---|---|
| 2009/0146119 A1* | 6/2009 | Bailey | B66D 1/12 | |
| | | | 254/323 | |
| 2009/0320248 A1* | 12/2009 | Naquin | F16G 11/02 | |
| | | | 24/129 R | |
| 2017/0121154 A1* | 5/2017 | Costa | F16G 15/06 | |

OTHER PUBLICATIONS

*Warn Industries Inc.*, vs. *Agency 6 Inc.*; Defendant's Motion to Dismiss for related U.S. Pat. No. 11,167,963; Case 2:22-cv-01358-WBS-JDP, filed Jan. 16, 2023; (285 pages).
*Warn Industries Inc.*, vs. *Agency 6 Inc.*; Opposition to Defendant's Motion to Dismiss for related U.S. Pat. No. 11,167,963; Case 2:22-cv-01358-WBS-JDP, filed Jan. 30, 2023; (28 pages).
*Warn Industries Inc.*, vs. *Agency 6 Inc.*; Defendant's Reply to Plaintiff's Opposition to Motion to Dismiss for related U.S. Pat. No. 11,167,963; Case 2:22-cv-01358-WBS-JDP, filed Feb. 9, 2023; (25 pages).
*Warn Industries, Inc.*, vs. *Agency 6 Inc.*; Original Complaint for Patent Infringement for related U.S. Pat. No. 11,167,963; Case 2:22-cv-01358-WBS-JDP; filed Jul. 29, 2022; (63 pages).
USPTO, Reexamination Order mailed Mar. 1, 2023 for U.S. Appl. No. 90/019,156, ex parte reexamination of U.S. Pat. No. 11,167,963.

* cited by examiner

SYSTEMS FOR WINCH ROPE INTERFACES AND RECOVERY RIGGING MOUNTABLE TO A WINCH FAIRLEAD AND/OR VEHICLE BUMPER

PRIORITY CLAIM

The present application is a divisional of U.S. patent application Ser. No. 16/176,169, entitled "SYSTEMS FOR WINCH ROPE INTERFACES AND RECOVERY RIGGING MOUNTABLE TO A WINCH FAIRLEAD AND/OR VEHICLE BUMPER," filed Oct. 31, 2018, which claims priority to U.S. Provisional Application No. 62/580,289, entitled "SYSTEMS FOR WINCH ROPE INTERFACES AND RECOVERY RIGGING MOUNTABLE TO A WINCH FAIRLEAD AND/OR VEHICLE BUMPER," filed Nov. 1, 2017, the entire contents of which are incorporated by reference herein and relied upon as if reproduced herein.

BACKGROUND

Vehicles, such as off-road vehicles, commercial/utility trucks, and tow trucks, as well as recreational vehicles, such as pick-up trucks and sport utility vehicles, are often equipped with winches. The winch may include a rotatable drum driven by a motor to pull in or let out a rope or cable wound around the drum. The winch, with accompanying motor and drum, may be installed at a front end of the vehicle. In addition, winches often include a fairlead to guide the cable during the winding and unwinding of the cable from the drum. The fairlead may ensure even distribution of the cable across the width of the drum and prevent the cable from becoming tangled. The terminal end of the cable is often coupled to a metal cable terminal. Upon winding the cable rapidly, the metal cable terminal may contact the fairlead with force, hitting the fairlead or becoming jammed in the fairlead. Such contact may damage the fairlead surface, thereby reducing or eliminating the effectiveness of the fairlead's functionality.

SUMMARY

The present application relates generally to devices, systems, and methods for interfacing winch cable terminals with rigging devices and attaching rigging devices to mounting points. In one example, the above issues may be at least partially addressed by a method and apparatus for coupling the terminal end of a winch cable with a rigging interface comprising surfaces adapted for nesting the rigging interface with a winch fairlead. The rigging interface may have a first curved surface configured to complement the outer surface of the fairlead and a second surface adapted to interface with a cable. In this way, the rigging interface may act as a winch cable terminal, enabled to couple with other rigging devices, while having a geometry that enables the rigging interface to be in contact with the fairlead without causing damage.

In another example, a rigging device according to the present disclosure may be used as the winch cable terminal, where the rigging device may also have a rear-facing surface that is curved to nest against the front surface of the fairlead when the cable is fully retracted. The rigging device may include a vertical extension that is removable, thereby allowing the rigging device to be couple to other objects via the removable vertical extension.

In a third example, a rigging device according to the present disclosure may have two vertical extensions, disposed at opposite ends of the rigging device. The rigging device may act as a connector between a winch cable terminal adapted with a hook or shackle and a mounting point. As such, the rigging interfaces and rigging devices disclosed herein may enable the coupling of winch cables to other objects while protecting the fairlead. In some embodiments, the disclosed rigging device further provides secure attachment of the rigging devices and to other objects.

In light of the disclosure herein, and without limiting the scope of the invention in any way, in a first aspect of the present disclosure, which may be combined with any other aspect listed herein unless specified otherwise, a rigging interface for a winch fairlead includes a first curved surface and a second curved surface. The first curved surface is arranged on an inner side of the rigging interface, the inner side including two side portions spaced apart from one another in vertical direction. The first curved surface is adapted to nest to a front of the winch fairlead. The second curved surface is adapted to interface with a cable extending outward from the winch fairlead and wound around a drum of the winch. The second curved surface is at least partially formed by an outer side of the rigging interface that is arranged opposite the inner side.

In a second aspect of the present disclosure, which may be combined with any other aspect listed herein unless specified otherwise, the first curved surface is adapted to nest to each of a front surface of a hawse fairlead and a front surface of a roller fairlead.

In a third aspect of the present disclosure, which may be combined with any other aspect listed herein unless specified otherwise, the rigging interface further includes a vertical extension extending vertically across the rigging interface and spanning a space that separates the two side portions, the vertical extension including curved outer surfaces.

In a fourth aspect of the present disclosure, which may be combined with any other aspect listed herein unless specified otherwise, the outer side includes two side portions spaced apart from one another in the vertical direction and further includes two planar surfaces. Each planar surface of the two planar surfaces extends between one of the two side portions of the inner side and one of the two side portions of the outer side. A distance between the two planar surfaces forms an opening in the rigging interface adapted to receive the cable. The second curved surface is formed between a corresponding one of the two planar surfaces and an outer, curved surface of one of the two side portions of the outer side.

In a fifth aspect of the present disclosure, which may be combined with any other aspect listed herein unless specified otherwise, a vertical extension extends vertically across the distance between the two planar surfaces and further forms the opening.

In a sixth aspect of the present disclosure, which may be combined with any other aspect listed herein unless specified otherwise, the outer side spans vertically across a distance separating the two side portions of the inner side and has a width, arranged in a horizontal direction, that is smaller than a width of each of the two side portions of the inner side.

In a seventh aspect of the present disclosure, which may be combined with any other aspect listed herein unless specified otherwise, the outer side includes two horizontal portions that extend in a horizontal direction and align with the two side portions of the inner side. The two horizontal portions are spaced apart from one another in the vertical direction by a same distance as the two side portions of the inner side. The outer side includes a vertical portion that extends vertically between the two horizontal portions and extends in the horizontal direction only along a portion of a length of the two horizontal portions, the length defined in the horizontal direction.

In a eighth aspect of the present disclosure, which may be combined with any other aspect listed herein unless specified otherwise, the vertical portion is spaced apart from a vertical extension, the vertical extension narrower than the vertical portion and extending vertically between the two horizontal portions.

In a ninth aspect of the present disclosure, which may be combined with any other aspect listed herein unless specified otherwise, a rigging device includes a base, a first vertical extension, and a second vertical extension. The base includes an upper section and lower section, separated from one another by a gap. The upper and lower sections each extend from a front-facing surface to a rear-facing surface of the base. The rear-facing surface is curved and adapted to nest against a front surface of a fairlead of a winch. The front-facing surface includes a vertical wall extending across the gap and coupling the upper section to the lower section. The first vertical extension extends between the upper section and lower section, at a first end of the base including the vertical wall. The second vertical extension extends between the upper section and lower section at a second end of the base not including the vertical wall.

In a tenth aspect of the present disclosure, which may be combined with any other aspect listed herein unless specified otherwise, the vertical wall only extends across a portion of the front-facing surface.

In a eleventh aspect of the present disclosure, which may be combined with any other aspect listed herein unless specified otherwise, each of the upper section and lower section includes a planar, inner surface, the inner surface of the upper section separated from the inner surface of the lower section by the gap, and further including curved surfaces formed between the inner surface and side surfaces of each of the upper section and lower section.

In a twelfth aspect of the present disclosure, which may be combined with any other aspect listed herein unless specified otherwise, the second vertical extension is removable from the base via an aperture extending through an entirety of the upper section.

In a thirteenth aspect of the present disclosure, which may be combined with any other aspect listed herein unless specified otherwise, a system for a vehicle includes a bumper, a winch, and a rigging device. The bumper of the vehicle includes a mounting point. The winch is mounted behind the bumper and includes a fairlead mounted to a front of the winch. The fairlead is spaced away from the mounting point. The rigging device includes a first end including a first mounting interface adapted to couple with the mounting point. The rigging device further includes a curved, inner surface shaped to nest against a front surface of the fairlead. The rigging device further includes a second end including a second mounting interface adapted to couple to a cable of the winch.

In a fourteenth aspect of the present disclosure, which may be combined with any other aspect listed herein unless specified otherwise, the inner surface extends between the first end and second end and is formed on two horizontal sections of the rigging device separated from one another via a gap.

In a fifteenth aspect of the present disclosure, which may be combined with any other aspect listed herein unless specified otherwise, the first end has a removable vertical extension adapted to thread through a mounting point positioned in the gap between the two horizontal sections of the rigging device.

In a sixteenth aspect of the present disclosure, which may be combined with any other aspect listed herein unless specified otherwise, the removable vertical extension has a threaded end that mates with threaded apertures in the two horizontal sections of the rigging device.

In a seventeenth aspect of the present disclosure, which may be combined with any other aspect listed herein unless specified otherwise, the removable vertical extension includes a bolt head at an opposite end from the threaded end, enabling the manual rotation of the vertical extension.

In a eighteenth aspect of the present disclosure, which may be combined with any other aspect listed herein unless specified otherwise, the second mounting interface has a non-removable vertical extension adapted to be permanently coupled to the cable of the winch.

In a nineteenth aspect of the present disclosure, which may be combined with any other aspect listed herein unless specified otherwise, the fairlead is a hawse fairlead including an opening formed by a continuous curved surface, where the inner surface is shaped to nest against and top and bottom portion of the continuous curved surface.

In a twentieth aspect of the present disclosure, which may be combined with any other aspect listed herein unless specified otherwise, the fairlead is a roller fairlead including a pair of horizontal rollers and a pair of vertical rollers, where the inner surface is shaped to nest against the pair of horizontal rollers.

In a twenty-first aspect of the present disclosure, which may be combined with any other aspect listed herein unless specified otherwise, a method for using a rigging device for a winch of a vehicle includes three modes. The first mode includes nesting a curved, inner surface of a rigging device against a front surface of a fairlead of a winch mounted to a first vehicle. The second mode includes coupling a first mounting end of the rigging device to one of a strap, anchor point, or mounting point on a second vehicle while a second mounting end of the rigging device is coupled to a cable of the winch. The third mode includes coupling the first mounting end to a mounting point on a bumper of the first vehicle while the second mounting end is coupled to the cable of the winch.

In a twenty-second aspect of the present disclosure, which may be combined with any other aspect listed herein unless specified otherwise, the rigging device has a vertical extension extending across the rigging device to which a cable of the winch is coupled.

In a twenty-third aspect of the present disclosure, which may be combined with any other aspect listed herein unless specified otherwise, the rigging device has a second, removable extension that is adapted to be attached to a mounting point on the first or second vehicle.

In a twenty-fourth aspect of the present disclosure, which may be combined with any other aspect listed herein unless specified otherwise, a rigging device for a vehicle includes a H-shaped base, a first cylinder, and a second cylinder. The H-shaped base includes two legs spaced apart from one another by a gap and joined together at mid-section of the base by a horizontal section extending across the gap and formed at a first, outer surface of each of the two legs. The first cylinder extends across the gap and is removably coupled at a first end of the base to each of the two legs. The second cylinder extends across the gap and is removably coupled at a second end of the base to each of the two legs, the first end and second end arranged opposite one another across the horizontal section.

In a twenty-fifth aspect of the present disclosure, which may be combined with any other aspect listed herein unless specified otherwise, the first cylinder is coupled to a hook or shackle.

In a twenty-sixth aspect of the present disclosure, which may be combined with any other aspect listed herein unless specified otherwise, the second cylinder is connected to a mounting point on a bumper of a vehicle.

In a twenty-seventh aspect of the present disclosure, which may be combined with any other aspect listed herein unless specified otherwise, both the first and second cylinders are connected to hooks or shackles.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

As discussed briefly above, this disclosure is, in various embodiments, directed to devices, systems, and methods for rigging interfaces and rigging devices adapted to protect winch fairleads and connect winch cables to other objects. An exemplary vehicle equipped with a winch, drum, motor, and fairlead is shown in FIG. 1 as an example of a system to which a rigging interface and/or rigging device such as those described herein may be adapted.

Figure 3B:
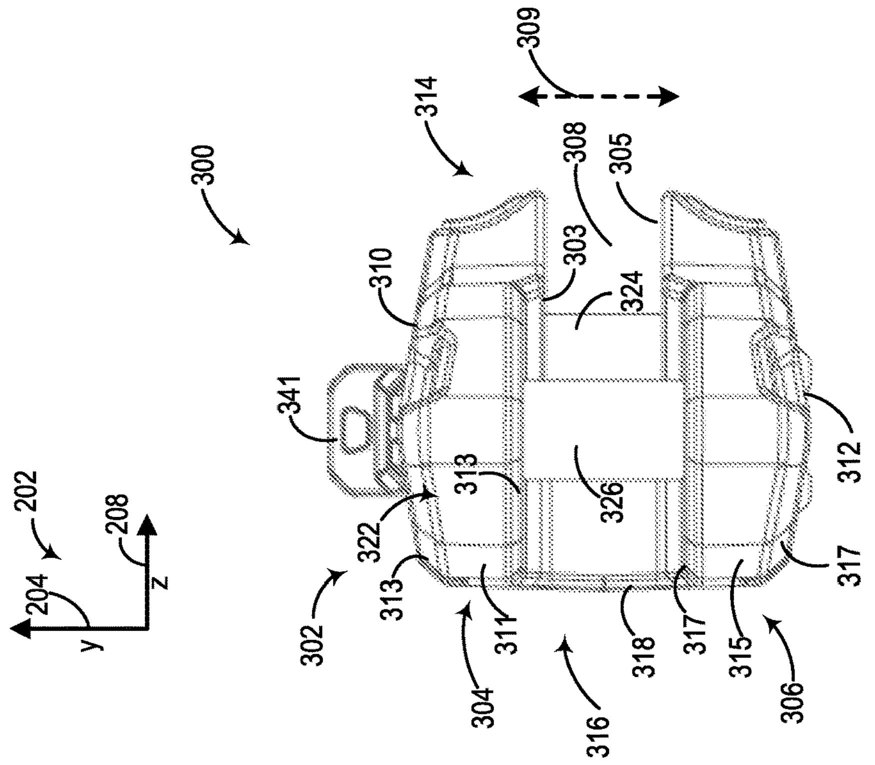
FIGS. 3A-3B illustrate an embodiment of a rigging device, depicting perspective and profile views.
Figure 3A:
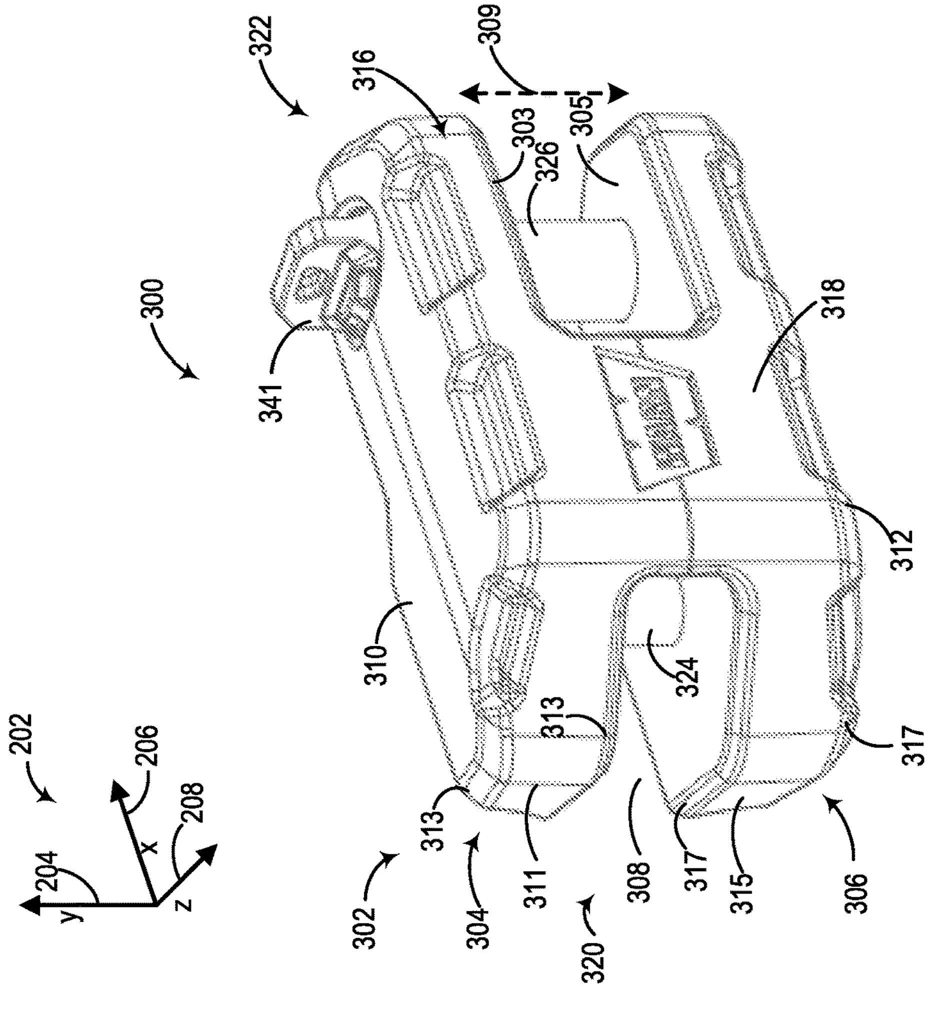
Figure 3C:
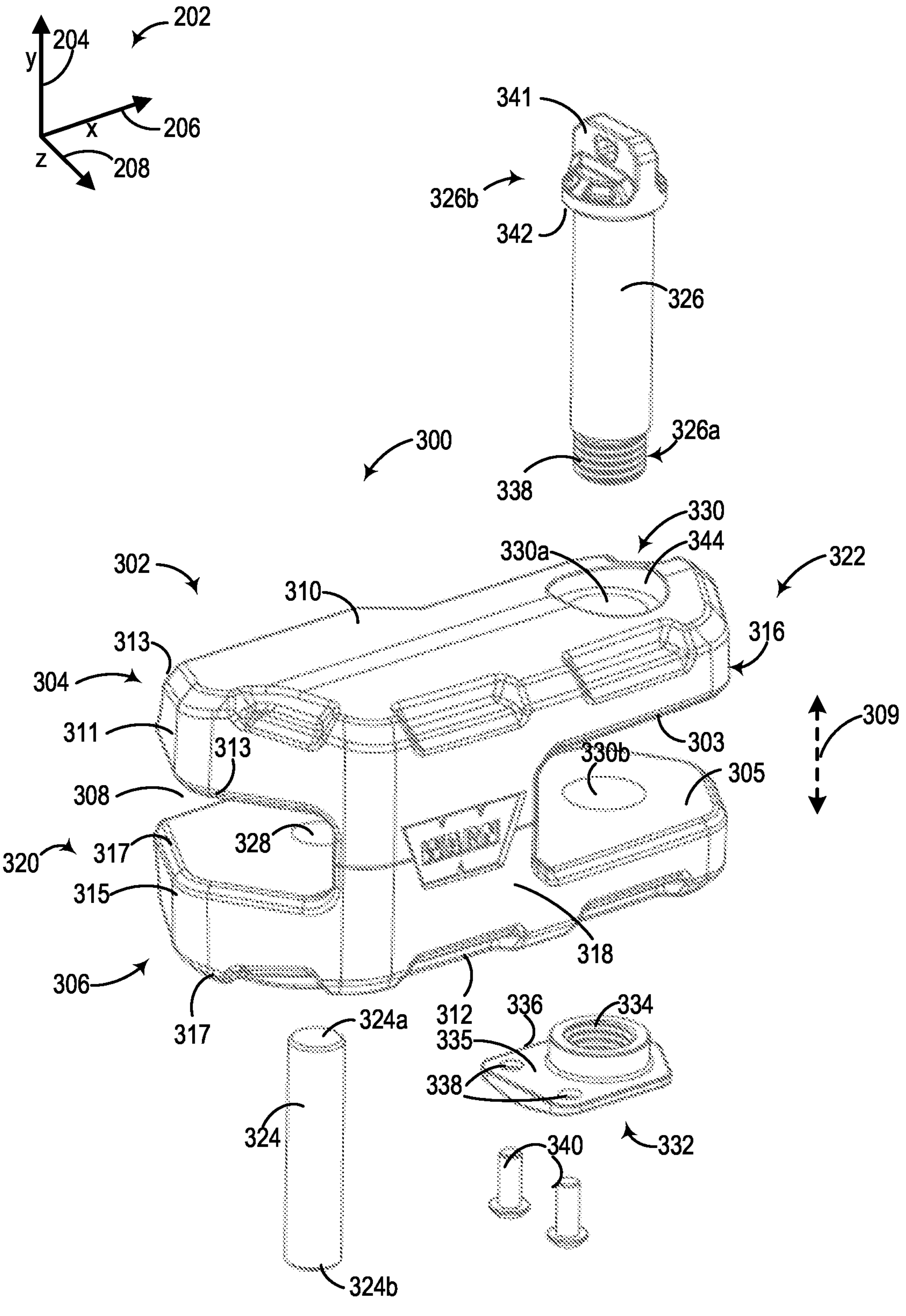
FIG. 3C illustrates an exploded view of the rigging device illustrated in FIGS. 3A-3B.
Figure 3D:
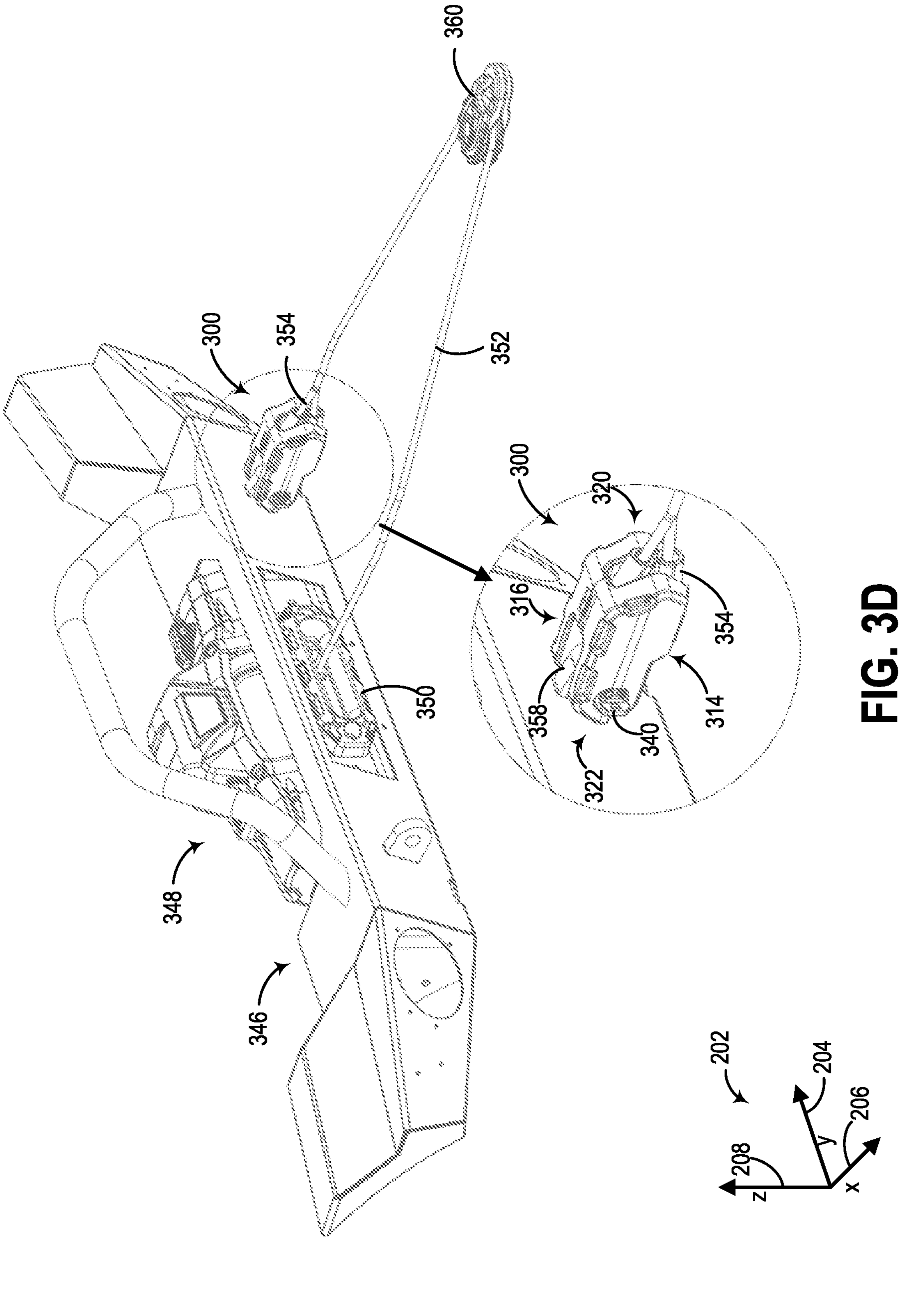
FIG. 3D illustrates an embodiment of the rigging device in use.
Figure 4B:
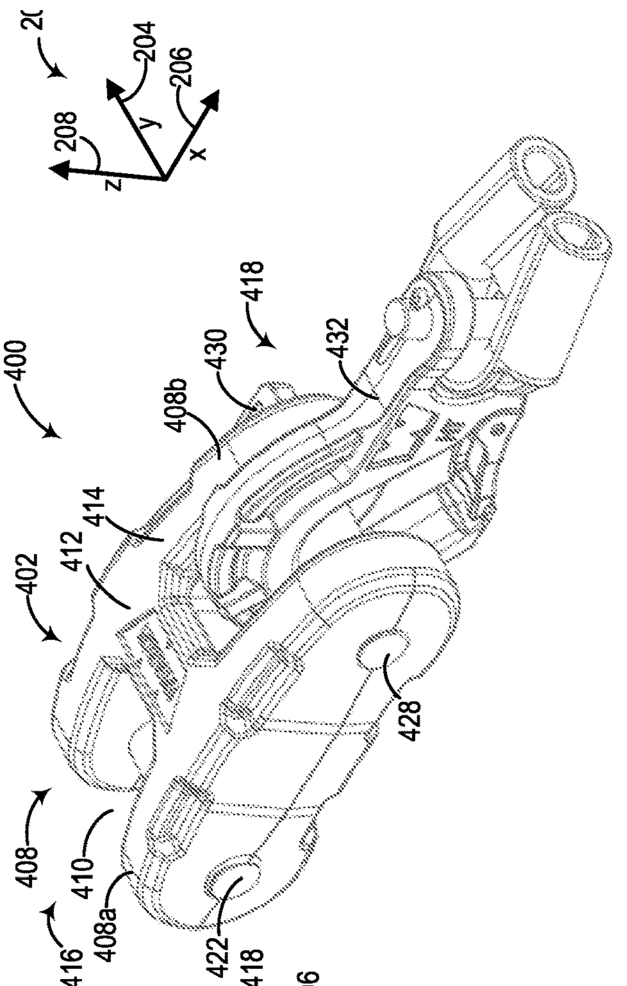
FIG. 4B illustrates an embodiment of the rigging device illustrated in FIG. 4A connected to a cable terminal.
Figure 4A:
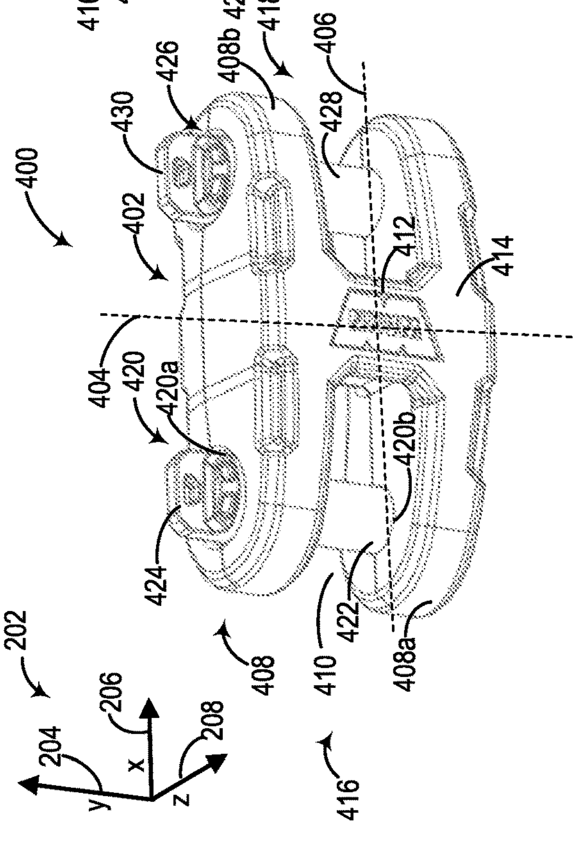
FIG. 4A illustrates an embodiment of a rigging device from a perspective view.
Figure 4C:
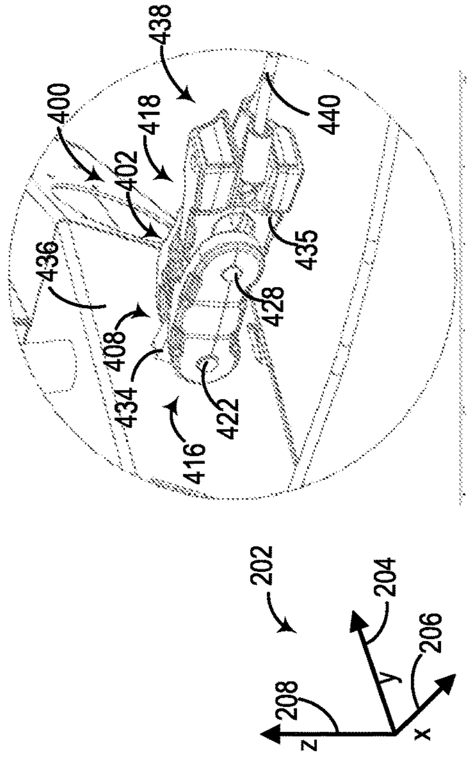
FIG. 4C illustrates an embodiment of the rigging device illustrated in FIG. 4A, connected to a cable terminal.

Embodiments of a rigging interface are illustrated by FIGS. 2A-2J where the nesting of the rigging interface to a fairlead is depicted, for each embodiment, as a top view along with an accompanying cross-section. For some of the embodiments illustrated by FIGS. 2C-2J, the coupling of the surfaces of the rigging interfaces to those of the fairlead are shown for two types of fairleads typically used on vehicles. For example, FIGS. 2C-D and 2G-H illustrate embodiments with hawse-type fairleads; FIGS. 2E-F and 2I-J illustrate embodiments with roller-type fairleads. It should be appreciated that any rigging interface or rigging device disclosed herein could be implemented with any type of fairlead, including hawse-type, roller-type, or any other type as to be expected. FIGS. 3A-3B illustrate embodiments of a rigging device that may function similar to the rigging interface at a first end, with a removable portion at a second end. FIG. 3C illustrates an exploded view of an embodiment of the rigging device, showing the plurality of parts and apertures included in the rigging device. FIG. 3D illustrates an example embodiment of how the rigging device may be used to attached a winch cable to an object at a mounting point. FIG. 4A illustrates an embodiment of a rigging device, configured with removable portions at a first end and a second end. FIG. 4B-C illustrate embodiments of the coupling of the rigging device to a winch cable terminal.

Figure 1:
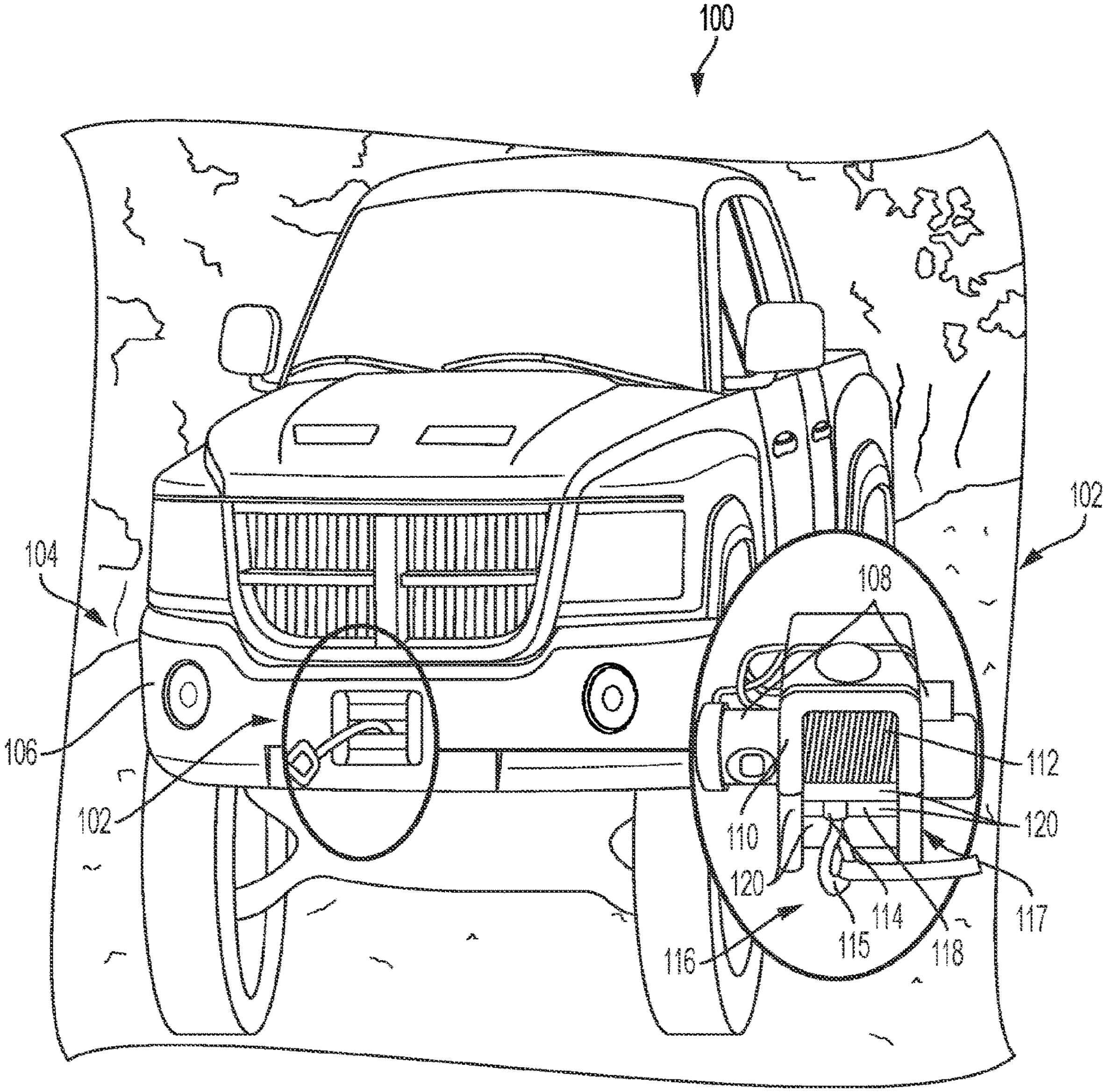
FIG. 1 illustrates an exemplary vehicle adapted with a winch system.

Turning now to the figures, FIG. 1 illustrates an exemplary vehicle 100 equipped with a winch system 102 at a front end 104 of the vehicle 100. The winch system 102 may be positioned within a front bumper 106 of the vehicle 100 so that the winch system does not protrude beyond a front surface of the front bumper 106. Alternatively, the winch system 102 may be positioned in front of the front bumper 106.

The winch system 102 in various embodiments may include a motor 108, a drum 110, a cable 112 wound around the drum 110, a cable terminal 114, and a fairlead 116. In one example, as shown in FIG. 1, the cable terminal 114 may be a loop formed of a metal material and may be coupled to a slip hook 115. In other examples, the cable terminal 114 may be coupled to a hook, latch, or shackle.

The fairlead 116 may comprise a roller-type fairlead frame 117, which may be formed from aluminum, anodized aluminum, steel, or other similar materials, with a central opening 118 through which the cable 112 may be extended or retracted. The fairlead 116 may have curved inner surfaces 120, surrounding the central opening 118, adapted to withstand friction from the rubbing of the cable 112 against the inner surfaces 120 when the winch system 102 is in use. The cable terminal 114 is typically larger than the central opening 118 so that the cable terminal cannot pass from the front of the central opening 118 to the rear of the central opening 118 of the fairlead 116. The cable terminal thus stops further retraction of the cable by contacting the inner surfaces 120 of the fairlead 116.

The motor 108 may be engaged to rotate the drum 110 so that the cable 112 may be unwound and extended from the drum 110 through the fairlead 116 or wound up and retracted through the fairlead 116. The fairlead 116 may guide the spooling of the cable 112 during retraction, ensuring that the cable 112 is evenly distributed across the drum 110 as it is wound up while simultaneously preventing the cable 112 from becoming tangled. The fairlead 116 may also act as a placeholder for the cable terminal 114, preventing the drum 110 from over-rotating so that cable terminal is positioned away from the front of drum and difficult for an operator to reach.

The cable terminal 114 may have a shape that prevents it from passing through the fairlead 116; nevertheless, these types of terminals are disadvantageous because they often permit movement of the cable terminal 114 when the vehicle 100 is in motion. For example, when the vehicle 100 is navigating uneven terrain, the cable terminal 114 may bounce, causing the cable terminal 114 to impact the metal frame of the fairlead 116. The impact may dent, crack, or deform the fairlead 116, thereby reducing the lifetime of the fairlead 116 and affecting the functionality of the fairlead 116. Thus, cable terminals 114 that are configured to protect the fairlead 116 are preferred.

Figure 2A:
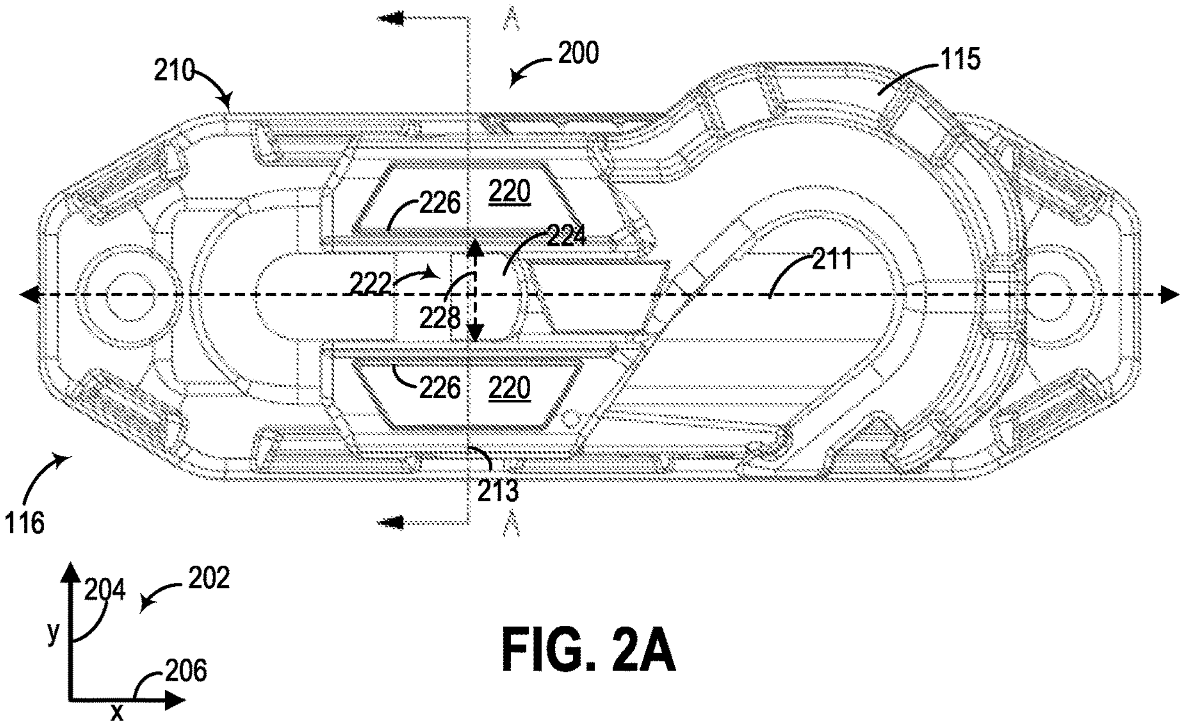
FIGS. 2A-2B illustrate an embodiment of a rigging interface, depicting top and cross-sectional views.
Figure 2B:
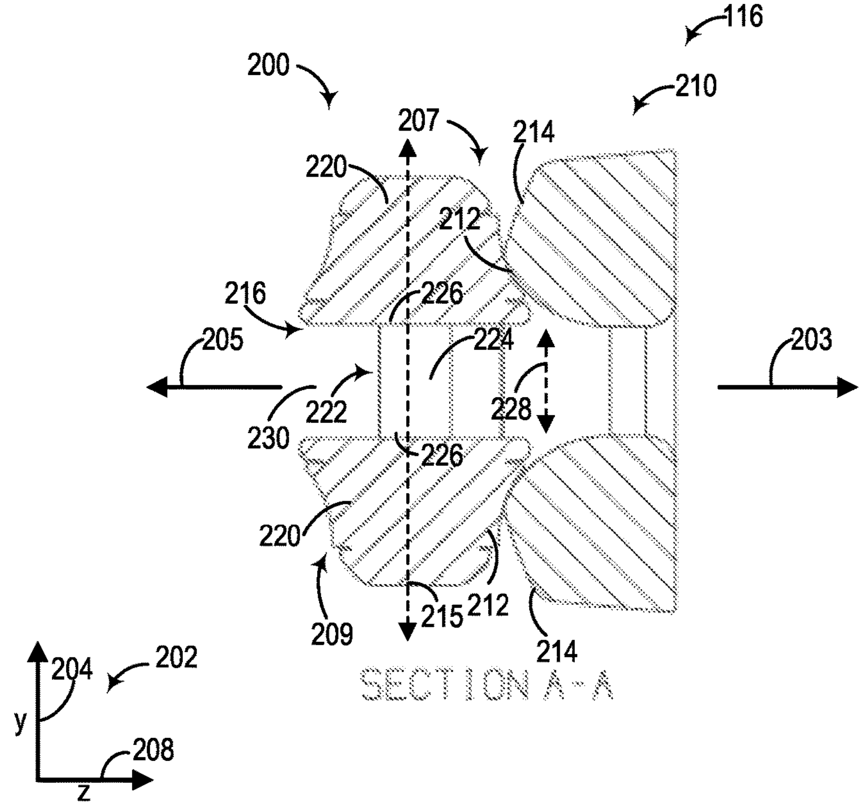
Figure 2D:
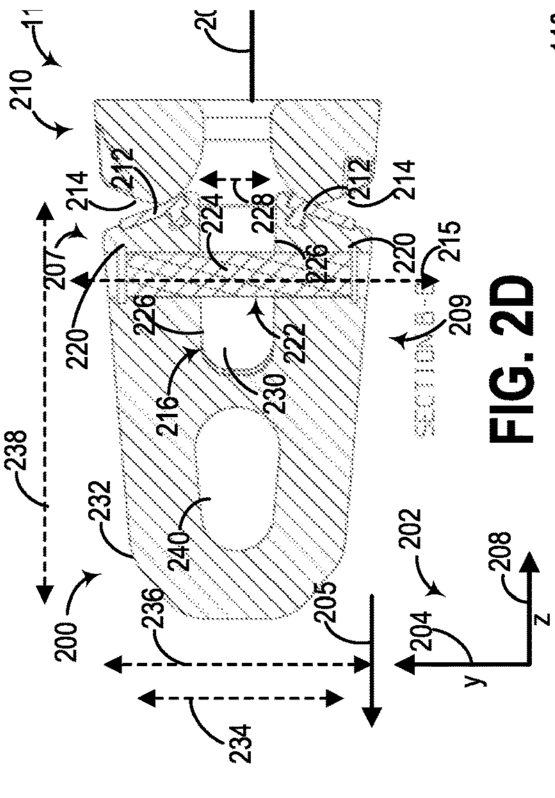
FIGS. 2C-2D illustrate an embodiment of a rigging interface, depicting top and cross-sectional views of the rigging interface nesting with a hawse fairlead.
Figure 2F:
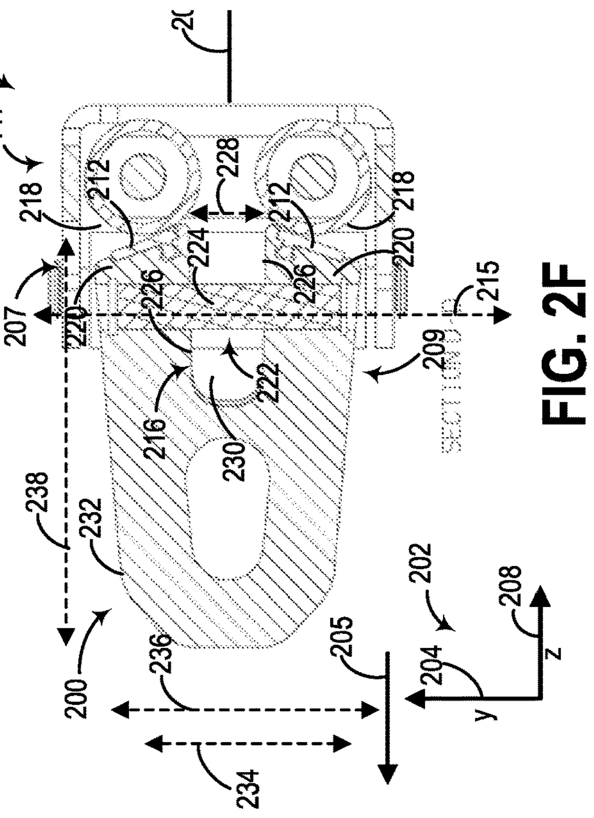
FIGS. 2E-2F illustrate an embodiment of a rigging interface, depicting top and cross-sectional views, nesting with a roller fairlead.
Figure 2C:
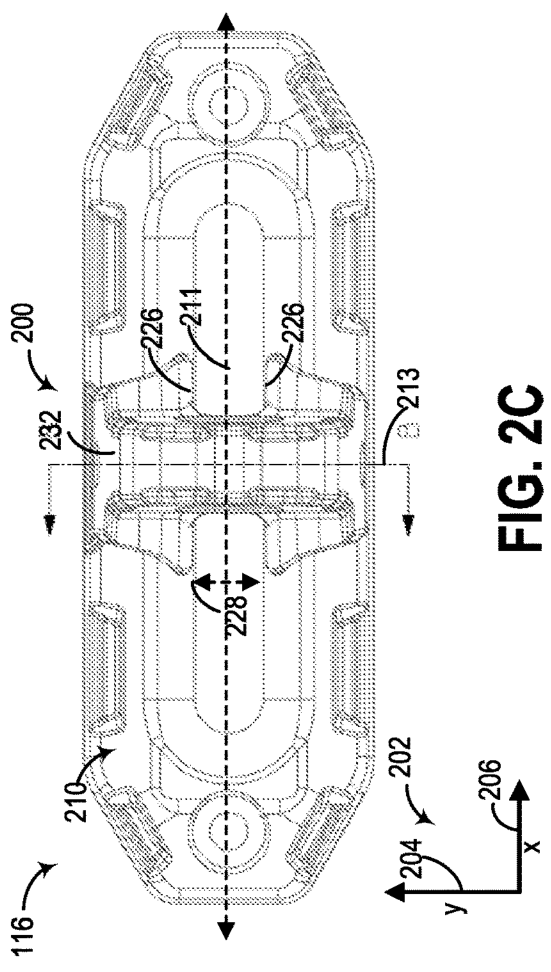
Figure 2E:
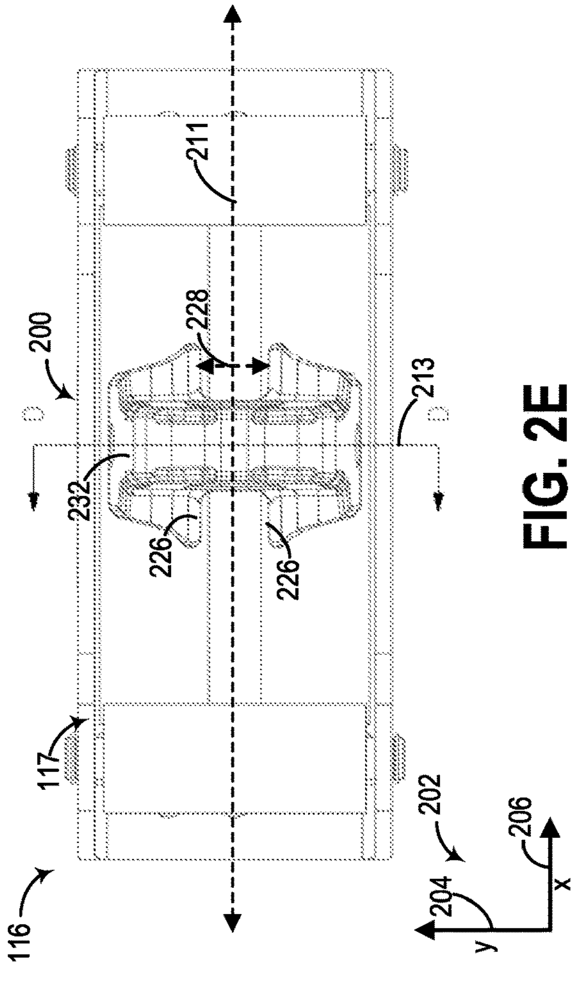
Figure 2G:
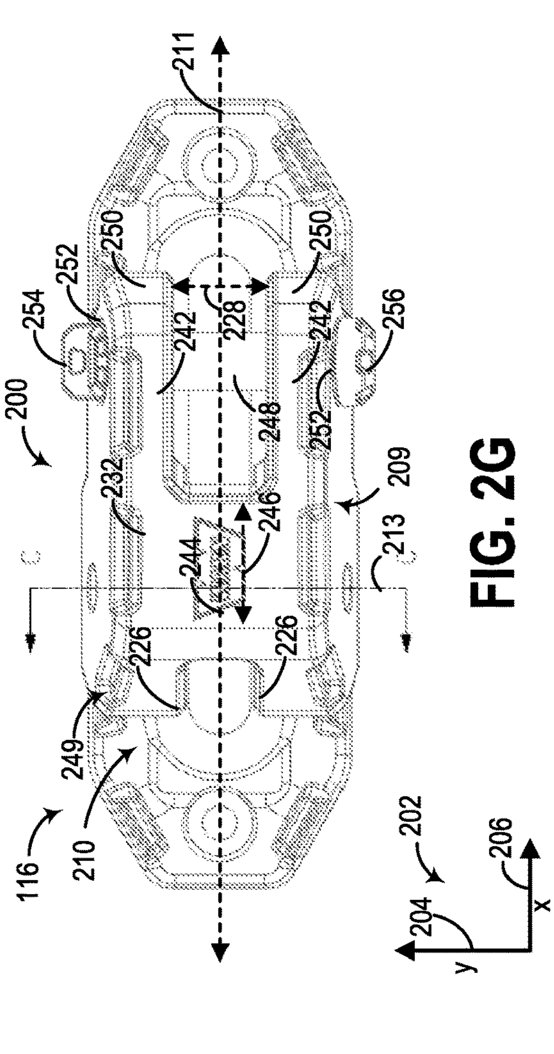
FIGS. 2G-2H illustrate an embodiment of a rigging interface, depicting top and cross-sectional views of the rigging interface nesting with a hawse fairlead.
Figure 2H:
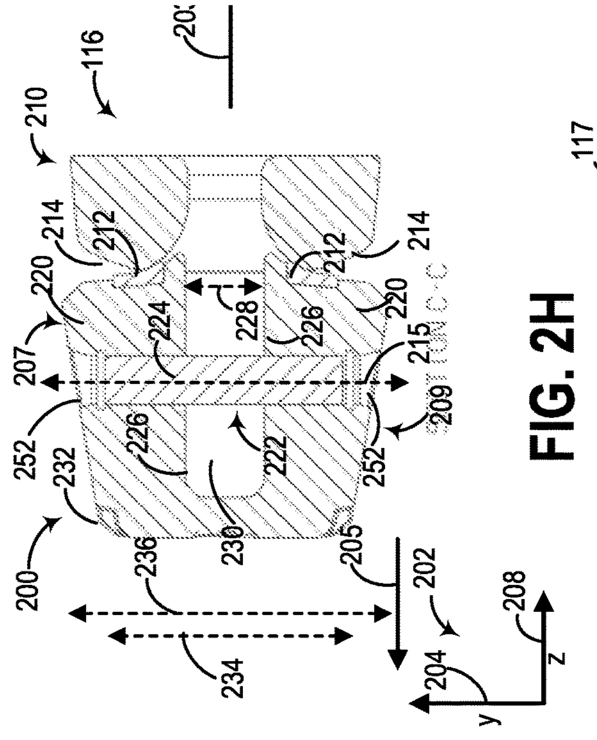
Figure 2I:
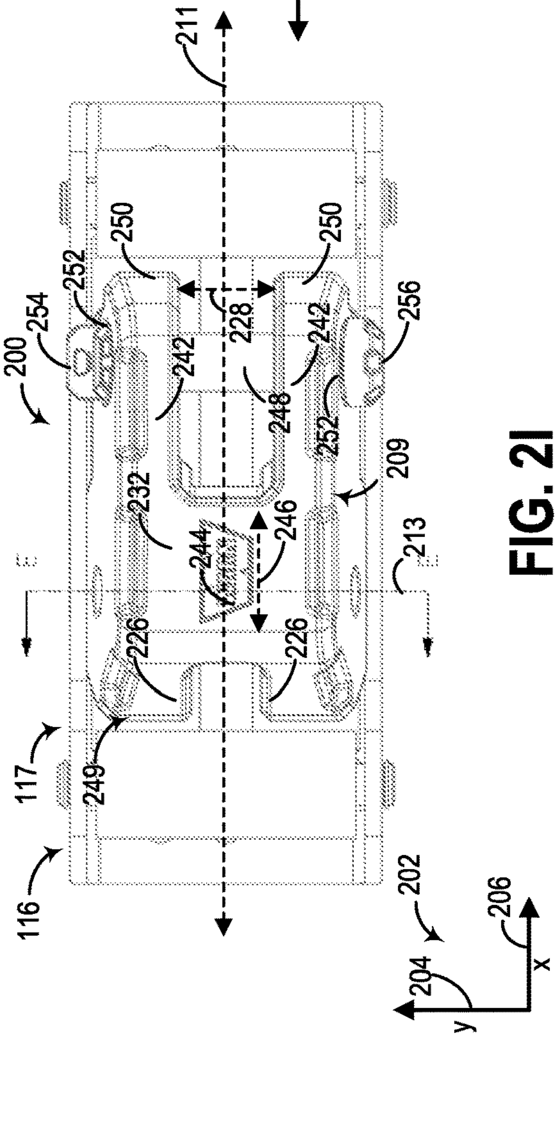
FIGS. 2I-2J illustrate an embodiment of a rigging interface, depicting top and cross-sectional views, nesting with a roller fairlead.
Figure 2J:
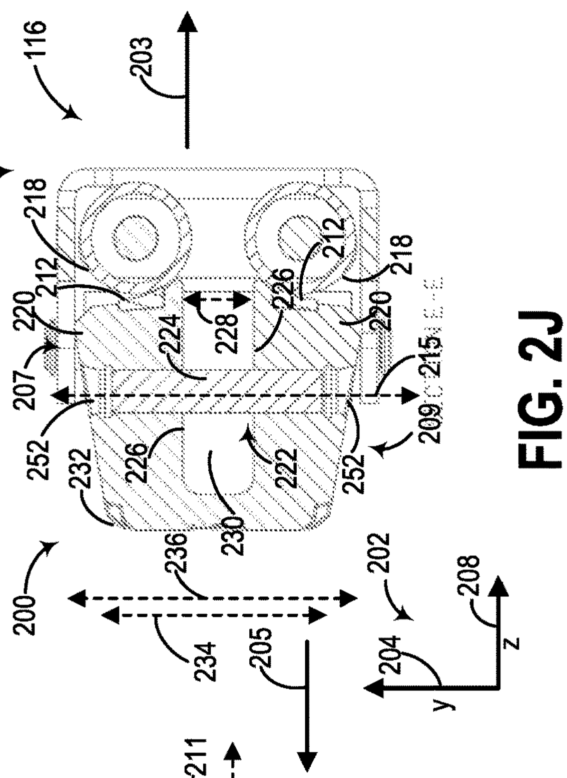

A rigging interface 200 coupled to an example of the fairlead 116 shown in FIG. 1 according to the instant disclosure is depicted in FIGS. 2A-2J, which may be adapted as a cable terminal for a cable, such as the cable terminal 114 and cable 112 of FIG. 1. The fairlead 116 may have a hawse-type fairlead frame 210 instead of the roller-type fairlead frame 117 shown in FIG. 1. The hawse-type fairlead frame 210 may include an opening formed by a continuous curved surface, as shown in FIGS. 2A, 2C, and 2G while the roller-type fairlead frame 117 may include a pair of horizontal rollers and a pair of vertical rollers, as shown in FIGS. 2E and 2I. A set of reference axes 202 is provided for comparison between views, indicating a "y" vertical direction 204, an "x" horizontal direction 206, and a "z" lateral direction 208. A first arrow 203 pointing towards the front of a vehicle, such as vehicle 100 of FIG. 1, and a second arrow 205 pointing outwards in a direction away from the vehicle is illustrated in FIGS. 2B, 2D, 2F, 2H, and 2J. The rigging interface 200 may have a first curved surface 212 arranged on an inner side 207, adapted to nest to a top and a bottom portion of a front surface 214 of the hawse-type fairlead frame 210, as shown in FIGS. 2B, 2D, and 2H. If the fairlead 116 has a roller-type fairlead frame 117, the rigging interface 200 is adapted to nest against a pair of horizontal rollers 218 of the roller-type fairlead frame 117, as shown in FIGS. 2F and 2J. The rigging interface 200 may also have a second curved surface 216, shown in FIGS. 2D, 2F, 2H, and 2J, arranged on an outer side 209, configured to interface with a cable, such as cable 112 of FIG. 1, extending outwards from the winch system, such as winch 102 shown in FIG. 1.

The first curved surface 212 on the inner side 207 of the rigging interface 200 may have two side portions 220 that are spaced apart from one another in the vertical direction 204. A vertical extension 222 may extend across the space separating the two side portions 220 and may have a curved outer surface 224. As shown in FIGS. 2D, 2F, 2H, and 2J, the outer side 209 of the rigging interface 200 may include the two side portions 220 as well as two planar surfaces 226, aligned with the lateral direction 208, each of which may extend between the inner side 207 and outer side 209 of one of the two side portions 220. A distance 228 between the two planar surfaces 226 may form an opening 230 in the rigging interface 200 that is adapted to receive the cable from the winch system. The second curved surface 216 on the outer side 209 of the rigging interface 200 may be formed between a corresponding one of the two planar surface 226 and an outer, curved surface 232 of one of the two side portions 220 of the outer side 209, as illustrated in FIGS. 2D, 2F, 2H, and 2J.

As illustrated by FIG. 2A, an embodiment of the rigging interface 200 may be mirror-symmetric about a first axis 211 that is coaxial with the horizontal direction 206. A cross-section taken along the line 213 in FIG. 2A, is depicted in FIG. 2B where the rigging interface 200 may also be mirror-symmetric about a second central axis 215 that is coaxial with the vertical direction 204. The vertical extension 222 spanning the distance 228 separating the two side portions 220 may also form the opening 230 adapted to receive the cable from the winch system. The cable may be coupled to a sliphook 115.

Another embodiment of the rigging interface 200 is illustrated by FIGS. 2C-2F, adapted to engage with or interface to a hawse-type fairlead frame 210 (FIGS. 2C-2D) and a roller-type fairlead frame 117 (FIGS. 2E-2F). It should be appreciated that the rigging interfaces disclosed herein can be used with any other type of frame for a fairlead. The rigging interface 200 of FIGS. 2C and 2E are mirror-symmetric about the first central axis 211 but the cross-sections shown in FIGS. 2D and 2F, taken along the line 213, are not mirror-symmetric about the second central axis 215. With reference to FIGS. 2D and 2F, the outer side 209 of the rigging interface 200 may span vertically, along the vertical direction 204, across the distance 228 between the two side portions 220 of the inner side 207. A width of the outer side 209 of the rigging interface 200, as indicated by an arrow 234 may be smaller than a width of each of the two side portions 220 of the inner side 207, as indicated by an arrow 236.

The rigging interface 200 in FIGS. 2C-2F may be longer in the lateral direction 208, indicated by an arrow 238 than the widths of the outer side 209 or inner side 207, indicated by arrows 234 and 236. An aperture 240 may be including in the outer side 209, adjacent to and aligned, along the lateral direction 208, with the opening 230. The aperture 240 may provide a place to grip the rigging interface more securely, accommodating the fingers of a user's hand or enabling a cable end or a cable adapted with a hook to be looped through the aperture 240.

Another embodiment of the rigging interface 200 is illustrated by FIGS. 2G-2J, configured to interface with or be nested to a hawse-type fairlead frame 210 of the fairlead 116 in FIGS. 2G-2H and to a roller-type fairlead frame 117 in FIGS. 2I-2J. The rigging interface 200 may be mirror-symmetric about the first central axis 211, as shown from the top views provided in FIGS. 2G and 2I, but not about the second central axis 215 shown in the cross-sections taken from line 213, with reference to FIGS. 2G and 2I, and illustrated in FIGS. 2H and 2J. The outer side 209 of the rigging interface 200 may span vertically, along the vertical direction 204, across the distance 228 between the two side portions 220 of the inner side 207. A width of the outer side 209 of the rigging interface 200, as indicated by an arrow 234 may be smaller than a width of each of the two side portions 220 of the inner side 207, as indicated by an arrow 236, as shown in FIGS. 2H and 2J.

The outer side 209 of the rigging interface 200 shown in FIGS. 2G and 2I may also include two horizontal portions 242, extending along the horizontal direction 206 and aligned with the two side portions 220, of FIGS. 2H-2J, of the inner side 207. The two horizontal portions 242 may be spaced apart from one another in the vertical direction 204 by a same distance as the distance 228 between the two side portions 220 of the inner side 207. The outer side 209 may include a vertical portion 244 that extends vertically, in the vertical direction 204, between the two horizontal portions 242 as well as extending in the horizontal direction 206 along a portion of a length of the two horizontal portions 242, as indicate by an arrow 246, the length being defined in the horizontal direction 206. The vertical portion 244 may be spaced apart from a first vertical extension 222, shown in FIGS. 2H and 2J, with the vertical extension 222 being narrower, as measured in the horizontal direction 206, than the vertical portion 244.

The vertical portion 244 may extend between a first set of ends 249 of the horizontal portions 242 and a second vertical extension 248, shown in FIGS. 2G and 2I, may extend between a second set of ends 250 of the horizontal portions 242. The second vertical extension 248 may be cylindrical in shape and may slide into a set of apertures 252 arranged in the second ends 250 of the horizontal portions 242. The second vertical extension may include a bolt head 254 for a user to grip so that the second vertical extension may be removed, e.g., slid out of, the apertures 252. In an embodiment, a nut 256, into which an end of the second vertical extension 238 may be coupled, may secure the second vertical extension 248 in the apertures 252. In one example, the nut 256 may have an inner cavity with threaded walls adapted to mate with threading on the outer surface of the end of the second vertical extension 248. Alternatively, the nut 256 and the end of the second vertical extension 248 may have a twist-and-lock type configuration. In another example, the nut 256 and the end of the second vertical extension 248 may be pressure-fitted to one another. In yet another example, the second vertical extension 248 is secured into the apertures 252 via snap-fit, interference-fit, or other techniques. As such, it will be appreciated that the scope of the present disclosure should not be limited by the coupling of the nut 256 and the end of the second vertical extension 248 described herein.

In this way, the rigging interface 200, according to the embodiments shown in FIGS. 2A-2J, may be configured to nest with the outer surfaces of the fairlead 116. The cable extending from the winch system, such as the cable 112 of the winch system 102 shown in FIG. 1, may interface with the curved outer surface 224 of the first vertical extension 222 as well as the inner surfaces of the opening 230 illustrated in FIGS. 2D, 2F, 2H, and 2J. An end of the cable may be coupled to the first vertical extension 222 so that the rigging interface 200 acts as a cable termination that is secured to the fairlead 116 due to the geometry of the inner side 207 of the rigging interface 200, thereby preventing damage to the fairlead 116 that may result from forceful contact between the cable terminal and the fairlead 116.

As another option for safe interfacing between a cable terminal, such as cable terminal 114 of FIG. 1, and a fairlead, such as fairlead 116 of FIGS. 1-2J, a rigging device 300 is illustrated in FIGS. 3A-3D that may be coupled to the end of a cable, such as cable 112 of FIG. 1. The rigging device 300 may also act as a cable terminal adapted to nest against the fairlead. The set of reference axes 202 is provided in FIGS. 3A-3D for comparison between views, indicating the "y" vertical direction 204, the "x" horizontal direction 206, and the "z" lateral direction 208. The rigging device 300 may include a base 302 with an upper section 304 and lower section 306.

The outer planar surfaces of the upper section 304 and lower section 306, which may also describe a top 310 and a bottom 312 of the rigging device 300, may be aligned with the planes formed by the horizontal direction 206 and lateral direction 208. The upper section 304 may also have a first inner planar surface 303 parallel with the top 310 of the base 302 and the lower section 306 may have a second inner planar surface 305 parallel with the bottom 312 of the rigging device 300. The upper section 304 may include side surfaces 311 with curved surfaces 313 disposed between the side surfaces 311 and the first inner planar surface 303 and between the side surfaces 311 and the top 310. The lower section 306 of the base 302 may similarly include side surfaces 315 with curved surfaces 317 disposed between the side surface 315 and the second inner planar surface 305 and between the side surface 315 and the bottom 312. A gap 308 may separate the first inner planar surface 303 from the second inner planar surface 305 and the presence of the gap 308 may be a key element in the structure of the rigging device 300 that enables coupling of the rigging device 300 to a mounting point. The height of the gap 308, as indicated by an arrow 309 may be optimized to accommodate different sizes and geometries of objects to which the rigging device may be attached.

The base 302 of the rigging device 300 may also have a rear-facing surface 314 that is curved and adapted to nest against the front surface of the fairlead, as shown in FIG. 3B. A front-facing surface 316 may be arranged on an opposite side of the rigging device 300 from the rear-facing surface 314 with both the front-facing surface 316 and rear-facing surface 314 aligned with the vertical direction 204. The upper section 304 and lower section 306 may extend between the front-facing surface 316 and rear-facing surface 314 of the base 302. The front-facing surface 316 may include a vertical wall 318 that extends, in the vertical direction 204, between the upper section 304 and lower section 306 across the gap 308. The vertical wall 318 may extend across a portion of the front-facing surface 318, arranged closer to a first end 320 of the rigging device 300 than a second end 322. In contrast, the first and second inner planar surfaces 303 and 305 extend fully across the base 302 of the rigging device 300 from the first end 320 to the second end 322.

The base 302 of the rigging device 300, including the upper section 304, lower section 306, front-facing and rear-facing surfaces 316 and 314, and the vertical wall 318, may serve as a rigid and durable framework for the rigging device 300. Within this framework, a first vertical extension 324 and a second vertical extension 326 may be disposed, acting as connection points to other objects. The first vertical extension 324 may be cylindrical, positioned at the first end 320 of the rigging device 300, adjacent to the vertical wall 318. The second vertical extension 326, also cylindrical in shape, may be positioned at the second end 322 of the rigging device 300 that does not include the vertical wall 318.

The arrangement of the first and second vertical extensions 324 and 326 within the base 302 of the rigging device 300 are illustrated more explicitly in FIG. 3C. The exploded view of the rigging device 300 in FIG. 3C shows that a first end 324*a* of the first vertical extension 324 may be mated to one of a first set of apertures 328 in the first inner planar surface 303 (not shown) of the upper section 304 of the base 302 and a second end 324*b* of the first vertical extension 324 may be mated to one of the first set of apertures 328 in the second inner planar surface 305 of the bottom section 306 of the base 302. One aperture of the first set of apertures 328 that is disposed in the upper section 304 of the base 302 may extend into the first inner planar surface but not entirely through the upper section 304 of the base 302. The other aperture of the first set of apertures 328, disposed in the lower section 306 of the base 302, may extend entirely through the lower section 306 as a through hole. The diameters of the first set of apertures 328 may be very similar to the diameter of the first vertical extension 324 so that the first vertical extension 324 may be slid through the through hole aperture of the first set of apertures 328 in the lower section 306 of the base 302 until the first end 324*a* is inserted into one of the apertures of the first set of apertures 328 positioned in the upper section 304 of the base 302. The first end 324*a* of the first vertical extension 324 may fit snugly into one of the apertures of the first set of apertures 328 so that the vertical extension 324 is held securely within the first set of apertures 328. The rigging device 302 may further include a retaining ring, configured to secure the second end 324*b* of the first vertical extension 324 to the aperture 328.

A second set of apertures 330 may be disposed in the second end 322 of the rigging device 300, including a first aperture 330*a* that is arranged as a through hole in the upper section 304 of the base 302 and a second aperture 330*b* that is also a through hole but positioned in the lower section 306 of the base 302. The diameters of the second set of apertures 330 may be similar to or slightly larger than the diameter of the second vertical extension 326, allowing the second vertical extension 326 to easily slide in and out of the second set of apertures 330. In an example, the second vertical extension 326 is secured to the apertures 330 similar to how the vertical extension 324 is secured to the apertures 328.

In a different example, the second vertical extension 326 may be secured differently to the base 302 of the rigging device 300 in comparison to the first vertical extension 324. For example, an end cap 332 with a threaded inner wall 334 and an attachment plate 336 may be configured to fit into the second aperture 330*b* so that a top planar surface 335 of the attachment plate 336 is flush and in face-sharing contact with the bottom 312 of the rigging device 300. The end cap 332 may then be attached to the bottom 312 of the rigging device via a pair of apertures 338 and a pair of bolts 340. The pair of apertures 338 may match a set of apertures disposed in the bottom 312 and extending into the lower section 306 of the base 302 of the rigging device 300, thereby allowing the bolts 340 to slide into the pair of apertures 338 in the end cap 332 and into the set of apertures in the bottom 312 to secure the end cap to an outlet of the second aperture 330*b*.

As described previously, the second vertical extension 326 is configured in some embodiments to slide into the second set of apertures 330 and thus may have a length, as defined in the vertical direction 204, that is sufficiently long for the second vertical extension to span across the thickness, as measured in the vertical direction 204, of the upper section 304 of the base 302, the gap 308, and the thickness, again measured along the vertical direction 204, of the lower section 306 of the base 302. A first end 326*a* of the second vertical extension 326 may be have a slightly smaller diameter than the body of the second vertical extension 326, and may be adapted with threading 338 that mates with the threaded inner walls 334 of the end cap 332. A second end 326*b* of the second vertical extension 326 may include a bolt head 341 so that the second vertical extension 326 may be easily rotated as well as a flange 342. The flange 342 of the second end 326*b* may be wider in diameter than the body of the second vertical extension 326 and may be accommodated by a lip 344 in an inlet of the first aperture 330*a* of the second set of apertures 330. Thus, the second vertical extension 326 may be removed from the base 302 via the first aperture 330*a*. The second vertical extension 326 may also be secured to the base by inserting the second vertical extension 326 into both the first aperture 330*a* and second aperture 330*b* and rotating the second vertical extension (via the bolt head 341) until the threading 338 at the first end 326*a* is fully mated with the threaded inner walls 334 of the end cap 332. Alternatively, the second vertical extension 326 is secured into the apertures 330 via snap-fit, interference-fit, or other techniques.

The descriptions provided for FIGS. 3A-3C show that the first and second vertical extensions, along with the other elements of the rigging device 300, may be configured for different roles in some embodiments. The first vertical extension 324 may be a relatively permanent structure in the rigging device. An end of a cable, for example, cable 112 of FIG. 1, may be coupled to the first vertical extension 324, which, upon insertion into the first set of apertures 328 may be held tightly in place by friction between the outer surface of the first vertical extension and the inner surfaces of the first set of apertures 328. As such, the rigging device 300 may act as a cable terminal, similar to the cable terminal 114 of FIG. 1 with the curved rear-facing surface 314 enabling nesting of the rigging device 300 against a hawse-type fairlead frame or a roller-type fairlead frame of a fairlead, with reference to the hawse-type fairlead frame 210, roller-type fairlead frame 117, and fairlead 116 of FIGS. 2A-2J. Rear-facing surface 314 may further include protrusions, such as plastic or rubber protrusions, configured to reduce impact forces, decrease vibration, and generally improve contact between the rigging device 300 and the frame or fairlead.

In addition to acting as the cable terminal, similar to the rigging interfaces 200 of FIGS. 2A-2J, the removable second vertical extension 326 may enable the attachment of the rigging device 300 to a mounting point, further illustrated in FIG. 3D. An exemplary bumper 346 of a vehicle, similar to the bumper 106 of vehicle 100 of FIG. 1, is depicted with a winch system 348, a hawse fairlead 350, a cable 352 with a thimble 354 and a mounting point 358 that is spaced away from the hawse fairlead 350. The elements of the rigging device 300 are shown in greater detail in the expanded insert of FIG. 3D. The rigging device 300 is oriented so that the rear-facing surface 314 is facing down and the front-facing surface 316 is facing up. The thimble 354 is connected to the first vertical extension 324, with reference to the first vertical extension 324 of FIGS. 3A-3C, at the first end 320 of the rigging device 300. The rigging device 300 is thus securely coupled to the cable 352 via the first vertical extension 324 once the first vertical extension 324 is inserted into the first set of apertures 328, as shown in FIGS. 3A-3C.

The rigging device 300 may be attached to the mounting point 358 on the bumper 346 of the vehicle by threading the second vertical extension 326, as shown in FIGS. 3A-3C, through the second set of apertures 330 and an aperture of the mounting point 358. The mounting point 358 is inserted in the gap 308 of the rigging device 300 between the upper section 304 and the lower section 306 of the base 302. When configured as shown in FIG. 3D, the second end 322 of the rigging device 300 may act as a double shear joint and enable the vehicle to be pulled forwards via the winch system 348 and rigging device 300 mounted on the bumper 346 of the vehicle, in conjunction with a pulley 360.

As such, the configuration of the rigging device 300 may enable three modes of use. A first mode for using the rigging device 300 includes nesting the curved, rear-facing surface 314, also described as an inner surface, against a front surface of a fairlead coupled to a winch system, such as the hawse fairlead 350 and winch system 348 of FIG. 3D, thereby preventing damage to the fairlead resulting from contact between a cable terminal, such as the cable terminal 114 of FIG. 1, and the fairlead. A second mode for using the rigging device 300 includes coupling the first end 320 of the rigging device 300, via the first vertical extension 324, to a cable 352 of the winch system 348, as shown in FIG. 3D, and connecting the removable second vertical extension 326 at the second end 322 to a mounting point on a second vehicle. The vehicle, such as vehicle 100 of FIG. 1 to which the winch system 348 is adapted, may then pull the second vehicle by way of the combined winch system 348 and rigging device 300. A third mode for using the rigging device 300 includes coupling the first end 320 and first vertical extension 324 to the cable 352 of the winch system 348, but attaching the second end 322 and the second vertical extension 326 to a mounting point 358 on the bumper 346 of the same vehicle in which the winch system 328 is included. In this way, the vehicle may pull itself with the additional assistance of a device such as the pulley 360 of FIG. 3D.

The rigging device 300 described above may have one end adapted with a removable vertical extension and the other end with a more permanent vertical extension for long-term coupling with a cable, with reference to the first and second vertical extensions 324, 326, and the cable 352 of FIG. 3D. In another embodiment of a rigging device, the rigging device 400 illustrated in FIGS. 4A-4C may include openings at opposite ends both adapted with removable vertical extensions for more transient connections between different objects and mounting points.

The set of references axes 202 is provided in FIGS. 4A-4C to compare the views shown, indicating the "y" vertical direction 204, the "x" horizontal direction 206, and the "z" lateral direction 208. The rigging device 400 of FIGS. 4A-4C has a base 402 that may be "H"-shaped and comprise a plurality of curved surfaces and edges. The base 402 may be mirror-symmetric about a first central axis 404, coaxial with the vertical direction 204, and about a second central axis 406, coaxial with the horizontal direction 206, as shown in FIG. 4A. The rigging device 400, however, may not be mirror-symmetric about the first central axis 404 or the second central axis 406 due to other features of the rigging device 400 further discussed below.

The outer geometry of the base 402 of the rigging device 400 may be optimally configured to provide a desired level of durability, strength and adaptability for the intended use of the rigging device 400. The base 402, in conforming to the shape of an "H", may have a first leg 408*a* and a second leg 408*b* of a pair of legs 408 extending along the horizontal direction 206 and spaced apart by a gap 410. The pair of legs 408 are joined at a central region of the base by a mid-section 412 extending across the gap 410 in the vertical direction 204. The mid-section 412 may be formed at an outer surface 414 of the base 402 that also covers the front surfaces of the pair of legs 408.

In addition to the pair of legs 408 and mid-section 412, the base 402 may have a first end 416 and a second end 418 that are identical and positioned at opposite ends of the base 402 across the horizontal length, along the horizontal direction 206, of the base 402. As such, it will be appreciated that while the aspects of the first end 416 will be discussed in detail, the description provided may be applied to the second end 418 as well. At the first end 416, the base may include a first set of apertures 420, with a first aperture 420*a* and a second aperture 420*b*, which extend entirely through the pair of legs 408. A first vertical extension 422 may be inserted into the first set of apertures 420 so that the first vertical extension 422 spans the thicknesses of the pair of legs 408, measured along the vertical direction 204, and the gap 410 between the first leg 408*a* and the second leg 408*b*. The first vertical extension 422 may be cylindrical and includes a first bolt head 424 at one end. The first bolt head 424 may extend out from a surface of the base 402 in the vertical direction 204, enabling a user to move the first vertical extension in and out of the first set of apertures 420 by holding the first bolt head 424.

At the second end 418 of the base 402, a second set of apertures 426 and a second vertical extension 428 with a second bolt head 430 may be similarly arranged as the elements of the first end 416. The second vertical extension 428 may be disposed in the second set of apertures 426 so that the second bolt head 430 is on a same side or on an opposite side as the first bolt head 424. Both the first and second vertical extensions 422 may be configured to removably couple with the first and second ends 416 and 418 of the base 402 through the pair of legs 408.

In one example of the rigging device 400, the first and second vertical extensions 422 and 428 may be secured within the first and second sets of apertures 420 and 426, respectively, via threading at an end of each of the first and second vertical extensions 422 and 428 that is opposite from the respective first and second bolt heads 424 and 430. The threaded ends may mate to threading disposed in the inner surfaces of the first and second sets of apertures 420 and 426. Alternatively, the first and second vertical extensions 422 and 428 may be adapted to fit snugly with the first and second sets of apertures 420 and 426 so that the vertical extensions may only slide in and out of the respective sets of apertures when force is applied. In yet another example, the first and second vertical extensions 422 and 428 and first and second sets of apertures 420 and 430 may be adapted with a twist-and-lock type mechanism or some other mechanism that enables efficient securing and release of the first and second vertical extensions 422 and 428 to and from the base 402 of the rigging device 400. In other examples, the first and second vertical extensions 422 and 428 may be secured into the apertures via snap-fit, interference-fit, or other techniques. As such, it will be appreciated that the scope of the present disclosure should not by limited by the mechanism of securing the first and second vertical extensions 422 and 428 to the base 402 disclosed herein.

FIGS. 4B and 4C show examples of how the rigging device 400 may be used as a connector to other objects. The rigging device 400 is illustrated in FIG. 4B with a slip hook 432 connected to the second vertical extension 428 at the second end 418 of the base 402. In other examples, the second vertical extension 428 may be coupled to a shackle, a D-ring, or some other connecting device. The arrangement of the slip hook 432 between the pair of legs 408 of the base 402 at the second end 418 and around the second vertical extension 428 allows the second end 418 to act as a double shear joint. The first end 416 of the rigging device 400 may be connected to another object via the first vertical extension 422 such as a mounting point 434 on a bumper 436 of a vehicle, as shown in FIG. 4C. In the example illustrated by FIG. 4C, the second end 428 of the base 402 may be coupled to a cable terminal 438 of a cable 440 adapted with a coupling device, similar to the cable terminal 114 and cable 112 of FIG. 1. The coupling device may be a thimble 433 to which the slip hook 432 may be attached, as shown in FIG. 4B, or a crocodile clip 435, as shown in FIG. 4C.

FIGS. 1-4C illustrate example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, a rigging interface may be adapted with curved surfaces that match the outer surfaces of a fairlead mounted to a winch system of a vehicle. The rigging interface, coupled to a cable terminal of a winch cable, may nest against the fairlead so that the cable terminal remains stationary during vehicle navigation, preventing the cable terminal from bouncing and contacting the fairlead with force. The rigging interface may also maintain the cable terminal at a position in front of the fairlead so that the cable terminal is readily accessible. As a modified alternative to the rigging interface, a rigging device, in one example, may act similarly as the rigging interface but include two ends, the first of which may be coupled to the cable terminal so that the rigging device may act as a cable terminal that nests to the outer surfaces of the fairlead. The second end may comprise a removable vertical extension, enabling the attachment of the second end to a mounting point on the same or another vehicle. In another example, a rigging device may have a removable vertical extension at both a first and a second end of the rigging device, allowing the rigging device act as a connector between a variety of objects and/or mounting points.

Using the rigging interface protects the fairlead of a winch system from damage due to impact from the cable terminal. Using the rigging device efficiently and securely connects objects and/or mounting points via the removable elements of the rigging device.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention claimed is:

1. A rigging device, comprising:

a base including an upper section and lower section separated from one another by a gap, the upper and lower sections each extending from a front-facing surface to a rear-facing surface of the base in a lateral direction, where the rear-facing surface is configured to contact a front surface of a fairlead of a winch, and where the front-facing surface includes a vertical wall extending across a portion of the gap in the vertical direction, where the front-facing surface and the vertical wall are coplanar, and where the vertical wall has a lateral width less than a lateral width of the upper section and the lower section; and a first vertical extension extending between the upper section and lower section.

2. A rigging device, comprising:

a base including an upper section and lower section separated from one another by a gap, the upper and lower sections each extending from a front-facing surface to a rear-facing surface of the base in a lateral direction, where the rear-facing surface is configured to contact a front surface of a fairlead of a winch, and where the front-facing surface includes a vertical wall extending across the gap in a vertical direction, wherein the front-facing surface and the vertical wall are coplanar, and wherein the vertical wall has a lateral width less than a lateral width of the upper section and the lower section; and a first vertical extension extending between the upper section and lower section.

3. The rigging device of claim 2, wherein the vertical wall only extends across a portion of the front-facing surface.

4. The rigging device of claim 2, wherein each of the upper section and lower section includes a planar, inner surface, the inner surface of the upper section separated from the inner surface of the lower section by the gap.

5. The rigging device of claim 4, wherein the gap is a distance such that a cable concurrently contacts the inner surface of the upper section and the inner surface of the lower section.

6. The rigging device of claim 2, wherein a second extension is coupled to the base.

7. The rigging device of claim 2, wherein the vertical wall only extends across a left portion of the front-facing surface.

8. A system for a vehicle, comprising:

a bumper of the vehicle including a mounting point;

a winch mounted behind the bumper and including a fairlead mounted to a front of the winch, the fairlead spaced away from the mounting point; and a rigging device including:

a first end including a first mounting interface adapted to couple with the mounting point, wherein the first mounting interface is a removable vertical extension adapted to thread through a mounting point positioned in the gap between two horizontal sections of the rigging device, and wherein the removable vertical extension has a threaded end that mates with threaded apertures in the two horizontal sections of the rigging device;

an inner surface configured to contact a front surface of the fairlead, wherein the inner surface extends between the first end and second end and is formed on the two horizontal sections of the rigging device separated from one another via a gap; and a second end including a second mounting interface adapted to couple to a cable of the winch.

9. The system of claim 8, wherein the removable vertical extension includes a bolt head at an opposite end from the threaded end, enabling the manual rotation of the vertical extension.

10. A system for a vehicle, comprising:

a bumper of the vehicle including a mounting point;

a winch mounted behind the bumper and including a fairlead mounted to a front of the winch, the fairlead spaced away from the mounting point; and a rigging device including:

a first end including a first mounting interface adapted to couple with the mounting point, wherein the first mounting interface is a removable vertical extension adapted to thread through a mounting point positioned in a gap between two horizontal sections of the rigging device;

a second end including a second mounting interface adapted to couple to a cable of the winch;

an inner surface configured to contact a front surface of the fairlead, wherein the inner surface extends between the first end and second end and is formed on the two horizontal sections of the rigging device separated from one another via the gap; and an outer surface including a vertical wall extending in the vertical direction, wherein the vertical wall is configured to couple the two horizontal sections, the two horizontal sections each extending from the first end to the second end in a lateral direction, wherein a front-facing surface and the vertical wall are coplanar, and wherein the vertical wall has a vertical width less than a horizontal width of the two horizontal sections.

11. The system of claim 10, wherein the removable vertical extension has a threaded end that mates with threaded apertures in the two horizontal sections of the rigging device.

12. The system of claim 11, wherein the removable vertical extension includes a bolt head at an opposite end from the threaded end, enabling the manual rotation of the vertical extension.

13. The system of claim 11, wherein the threaded aperture includes an end cap and an attachment plate.

14. The system of claim 11, wherein the removable vertical extension includes a flange at an opposite end from the threaded end to engage a lip in an aperture.

15. The system of claim 10, wherein the second mounting interface has a non-removable vertical extension adapted to be permanently coupled to the cable of the winch.

16. The system of claim 10, wherein the fairlead is a hawse fairlead including an opening formed by a continuous curved surface, where the inner surface is shaped to nest against a top and bottom portion of the continuous curved surface.

17. The system of claim 10, wherein the fairlead is a roller fairlead including a pair of horizontal rollers and a pair of vertical rollers, where the inner surface is shaped to nest against the pair of horizontal rollers.

18. The system of claim 10, wherein the second mounting interface is a removable vertical extension adapted to thread through a mounting point positioned in the gap between the two horizontal sections of the rigging device.

19. The system of claim 18, wherein the removable vertical extension has a threaded end that mates with threaded apertures in the two horizontal sections of the rigging device.

20. A rigging device, comprising:

an inner side including:

a lower side portion spaced apart from an upper side portion in a vertical direction, wherein the lower and upper side portions have respective surfaces on inner sides thereof that are (i) arranged on the inner side of the rigging device and (ii) configured to contact a front of a fairlead of a winch; and an opening, wherein the opening is formed between an upper planar surface on the lower side portion and a lower planar surface on the upper side portion, wherein a width of an outer side is smaller than a width of the inner side;

the outer side including:

a vertical wall extending in the vertical direction, wherein the vertical wall is configured to couple the lower side portion and the upper side portion in the vertical direction, wherein the outer side and the vertical wall are coplanar, and wherein the vertical wall has a vertical width less than a horizontal width of the upper side portion and the lower side portion; and an extension extending between the lower and upper side portions across the opening, wherein the extension is configured to be coupled to a cable such that the cable is couplable around the extension.

* * * * *